(12) United States Patent
Sakamoto et al.

(10) Patent No.: US 6,419,584 B1
(45) Date of Patent: Jul. 16, 2002

(54) GAME APPARATUS FOR PLAYING AN ELECTRONIC GAME BASED ON A DECK OF CARDS

(75) Inventors: Yoshio Sakamoto; Norikatsu Furuta; Makoto Katayama; Kenji Imai; Koichi Kishi; Kazuhiro Tamura, all of Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 97 days.

(21) Appl. No.: 09/714,664

(22) Filed: Nov. 17, 2000

(30) Foreign Application Priority Data

Nov. 17, 2000 (JP) ............................................. 11-326787

(51) Int. Cl.⁷ ................................................. A63F 13/00
(52) U.S. Cl. ................................. 463/43; 463/8; 463/9
(58) Field of Search .............................. 463/8, 42, 43, 463/47, 9; 345/419, 426, 473

(56) References Cited

U.S. PATENT DOCUMENTS

| | | | | |
|---|---|---|---|---|
| 5,662,332 A | * | 9/1997 | Garfield | 273/308 |
| 6,009,458 A | * | 12/1999 | Hawkins et al. | 463/1 |
| 6,061,656 A | * | 5/2000 | Pace | 380/277 |
| 6,126,544 A | * | 10/2000 | Kojima | 273/236 |
| 6,168,524 B1 | * | 1/2001 | Aoki et al. | 463/31 |
| 6,200,216 B1 | * | 3/2001 | Peppel | 463/1 |
| 6,347,994 B1 | * | 2/2002 | Yoshikawa et al. | 345/473 |
| 6,354,940 B1 | * | 3/2002 | Itou et al. | 463/29 |

* cited by examiner

Primary Examiner—Valencia Martin-Wallace
Assistant Examiner—John M Hotaling, II
(74) Attorney, Agent, or Firm—Nixon & Vanderhye P.C.

(57) ABSTRACT

A card game apparatus includes a display to display a game scene. In the game scene, a first master display site and a second master display site are formed to respectively display therein a first master as the other self of a game player and a second master as the other self of an opponent. The game player is allowed to select a monster card from a card hand display site and present it to a monster card presenting site. Responsive to an instruction of attack with a monster card, an attack power of the monster card is compared with the HP of a designated second master or the monster presented in the monster card presenting site, thereby arithmetically determining a battle result.

8 Claims, 11 Drawing Sheets

GAME APPARATUS FOR PLAYING AN ELECTRONIC GAME BASED ON A DECK OF CARDS

FIELD OF THE INVENTION

This invention relates to card game devices. More particularly, the invention relates to a card game apparatus wherein a battle is depicted, on the game screen of a hand-held game machine, between the characters (masters) with the use of cards forming a deck.

BACKGROUND AND SUMMARY OF THE INVENTION

A card game called "Pokemon card GB" is a card game played using a conventional hand-held game machine. In this card game, a hand-held game machine is used where monster cards battle one by one. If a certain number of an opponent's monster cards are defeated, victory is achieved in the game.

The conventional card game however depends merely upon the superiority or inferiority of the monster cards.

Therefore, it is a feature of the exemplary embodiments to provide a novel highly amusing, card game apparatus.

A card game apparatus according to the exemplary embodiments is a card game apparatus for playing a battle game between a game player camp and an opponent camp respectively including masters and characters representing monsters with the use of respective monster cards of a predetermined number, comprising: first master data storage (402a) storing an image of a first master representing a game player to be displayed in the game player camp and storing ability value data of the first master; second master data storage (402a) storing a figure of a second master representing an opponent to be displayed in an opponent camp and storing ability value data of the second master; card data storage (402b) storing images of a plurality of monster cards and ability value data thereof; a display (18) for displaying the first master and at least one monster in the game player camp and the second master and at least one monster in the opponent camp according to the data stored in the first master data storage, the second master data storage and the card data storage. Arithmetic operations are performed for arithmetically determining a result of a battle based upon the ability value of the first master or the monster in the game player camp and the ability value of the second master or the monster in the opponent camp.

Another feature of the illustrative embodiments is a card game apparatus which determines whether or not winning or losing of the game has occurred as a result of arithmetic operation by the operator.

Another feature of the illustrative embodiments is a card game apparatus, further comprising background data storage (402c) that stores background data including a first display site (64) to display the first master, a second display site (66) to display the second master, a third display site (68aa–68ab) to display a monster card in the vicinity of the first master, and a fourth display site (68ba–68bb) to display a monster card in the vicinity of the second master. In accordance with an illustrative embodiment, the first master and the second master are respectively displayed in the first display site and the second display site, and at least one monster is displayed in the third display site and the fourth display site.

A still another aspect of the illustrative embodiments is a card game apparatus, wherein the background data storage storing background data includes a fifth site (76) to display a plurality of monster cards selectable by the game player, further comprising an operating member (54a–54f) to be operated by the game player, wherein the game player is allowed to select any of the plurality of monster cards in the fifth site and display the monster in the third display site by operating the operating member. The result of the battle is determined based on an ability value of the first master or the monster displayed in the third display site and an ability value of the second master or the monster displayed in the fourth display site.

Still another aspect of the illustrative embodiments is a card game apparatus, wherein the third display site and the fourth display site respectively include a plurality monster display sites (68aa–68ab, 68ba–68bb).

Yet another aspect of the illustrative embodiments is a card game apparatus, wherein the plurality of monsters include an advance-guard monster capable of attacking a closely located master or a monster and a rear-guard monster capable of attacking a master or a monster in a distant position, the advance-guard monster and the rear-guard monster being to be displayed in respective monster display sites in the third display site and the fourth display site.

Yet another aspect of the illustrative embodiments is a card game apparatus further comprising magic card data storage storing kinds of magic of magic cards to apply magic to the master or the monster and ability values thereof, wherein the magic cards being used against the master or monster, further comprising a magic card processor (S307, S313) to process an effect of a magic card used against the master or the monster.

Another aspect of the illustrative embodiments is a card game apparatus, wherein respective ones of the data storage (402a, 402b, 402c) are included in a storage medium to be removably attached to the card game apparatus.

In one embodiment, a hand-held game machine is utilized. Game images are displayed on a liquid crystal display (LCD) provided on the hand-held game machine. However, this display may be separately provided from the game apparatus so that display signals only can be supplied from the game apparatus to the display.

In either case, the first and second master data storage store a figure and ability value data of the first master to be displayed in the game player camp as the image representing a game player and a figure and ability value data of the second master to be displayed in the opponent camp as the image representing an opponent. The card data storage stores figures and ability value data of the plurality of monster cards. A CPU causes the display to display a first master and at least one monster as well as a second master and at least one monster, according to the data stored in the first master data storage, second master data storage and card data storage. Arithmetic processing arithmetically determines a result of a battle based upon an ability value of the monster in the game player camp (specifically, attack power and HP) and an ability value of the second master or monster in the opponent camp.

A victory can be achieved on the side having reduced the master HP of the opponent camp to "0". The winning camp is awarded medals or cards, for example.

According to the illustrative embodiments, because victory is gained when finally defeating an opponent master, the superiority or inferiority determining a win-and-loss is not decided simply by card strength. Thus, the enhancement of card game strategy leads to enhanced player amusements.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
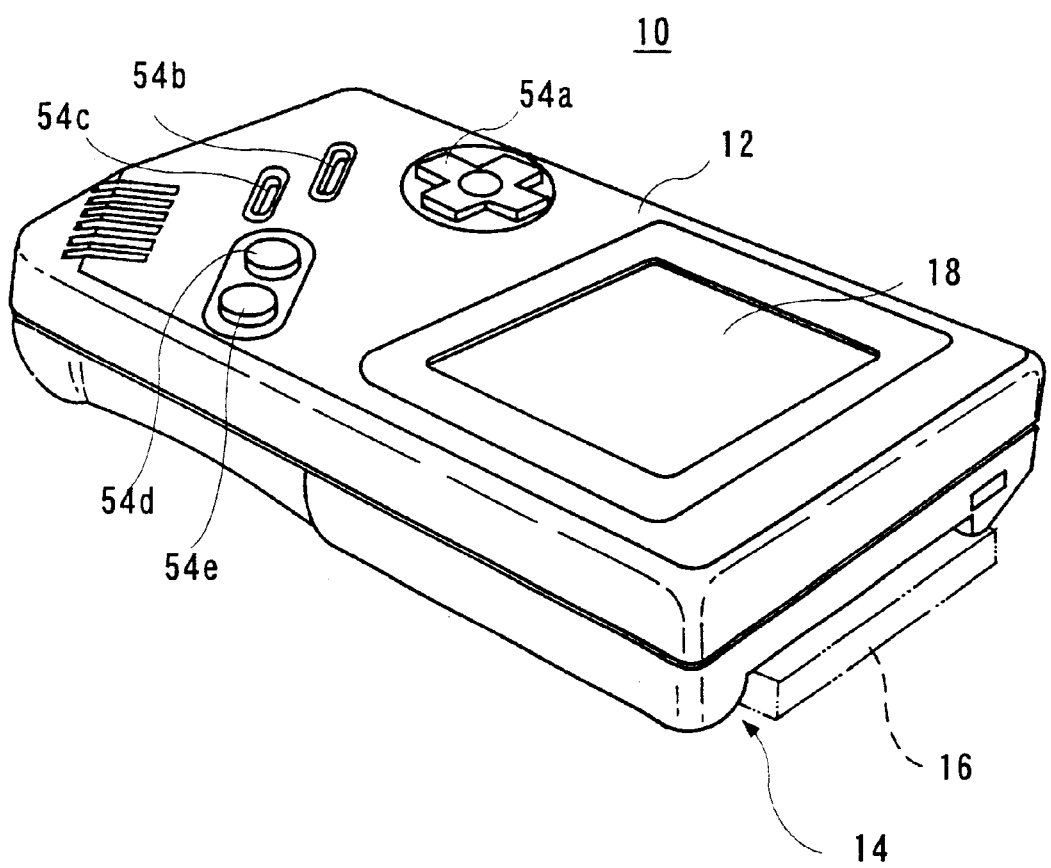
FIG. 1 is an external view of one example of a card game apparatus to which the present invention may be applied.

Referring to FIG. 1, a hand-held game machine 10 to which the present invention is applicable includes an elongate rectangular case 12. The case 12 has a cartridge insertion aperture 14 formed at a backside upper end thereof. By inserting a cartridge 16 in the insertion aperture 14, game scenes or menu screens can be displayed in color on a LCD 18 provided on a surface thereof. Note that the hand-held game machine 10 alternatively may be a game machine having a black-and-white type display.

Figure 2:
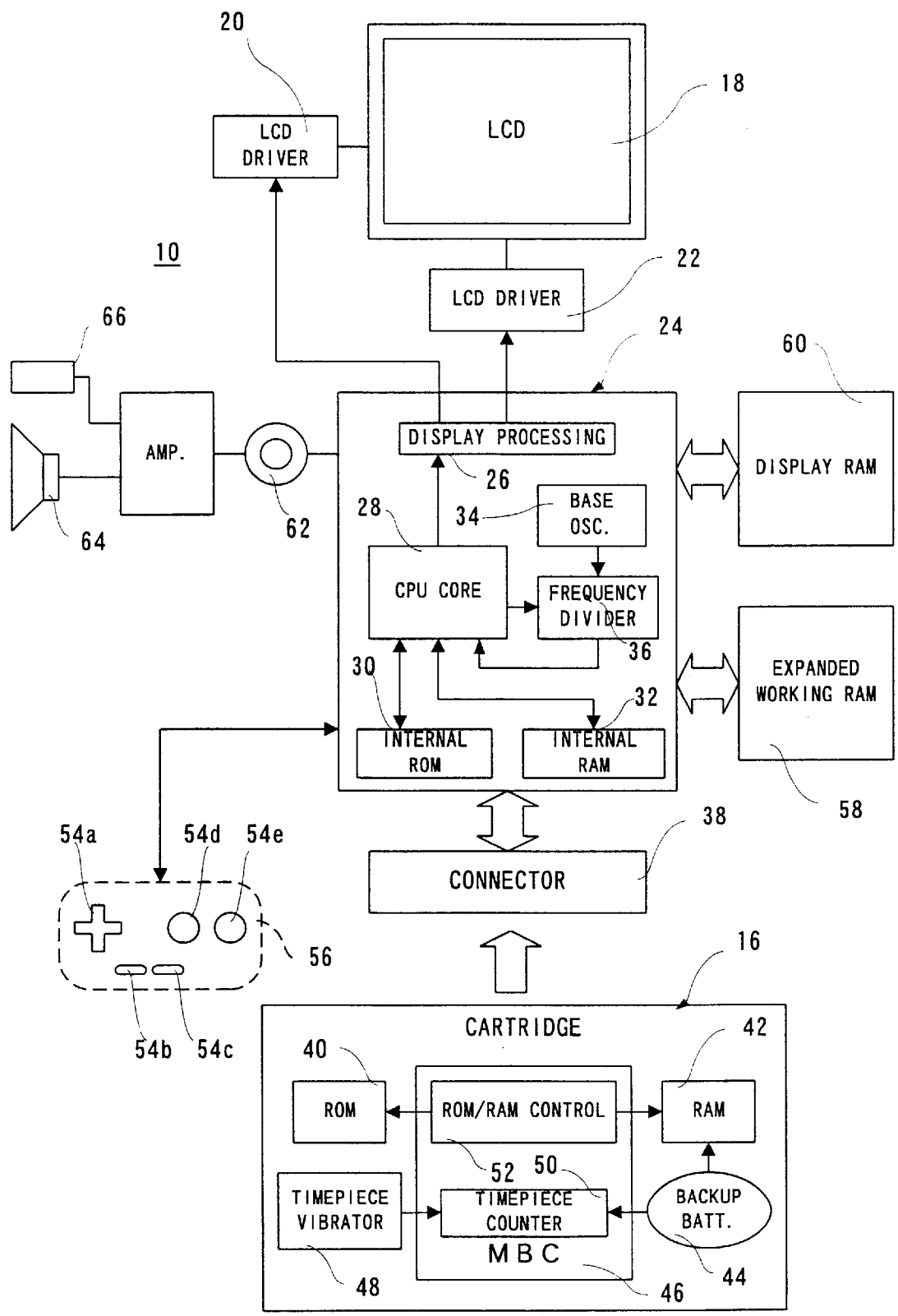
FIG. 2 is a block diagram of the card game apparatus of the one embodiment of the invention.

Referring to FIG. 2, the hand-held game machine 10 includes, as mentioned above, an LCD 18. The LCD 18 is configured as a dot-matrix display. The LCD 18 is driven by LCD drivers 20 and 22 to display color images on its screen. The LCD driver 20, for example, selectively drives rows or lines of the dot matrix display, while the LCD driver 22 selectively drives columns. The LCD drivers 20 and 22 are supplied with color image signals from a display processing circuit 26 included in a CPU 24.

The CPU 24 further includes a CPU core 28. This CPU core 28 is coupled to an internal ROM 30 and an internal RAM 32. The internal ROM 30 has an appropriate data area formed therein, in addition to a program area. The internal RAM 32 is utilized as a working memory for the CPU core 28.

The CPU 24 further includes a basic oscillator 34. The basic oscillator 34 uses, for example, a quartz oscillator to provide oscillation signals to a programmable frequency-divider 36. The programmable frequency-divider 36 frequency-divides an oscillation signal from the basic oscillator 34 according to frequency-division data from the CPU core 28 and supplies a frequency-divided signal as a clock signal for the CPU core 28.

The CPU 24 is connected via a connector 38 through a proper bus. Connector 38 is arranged deep inside the cartridge insertion aperture 14 shown in FIG. 1. By inserting a connector pin (not shown) of the cartridge 16, the cartridge 16 is electrically coupled to the CPU 24.

Figure 3:
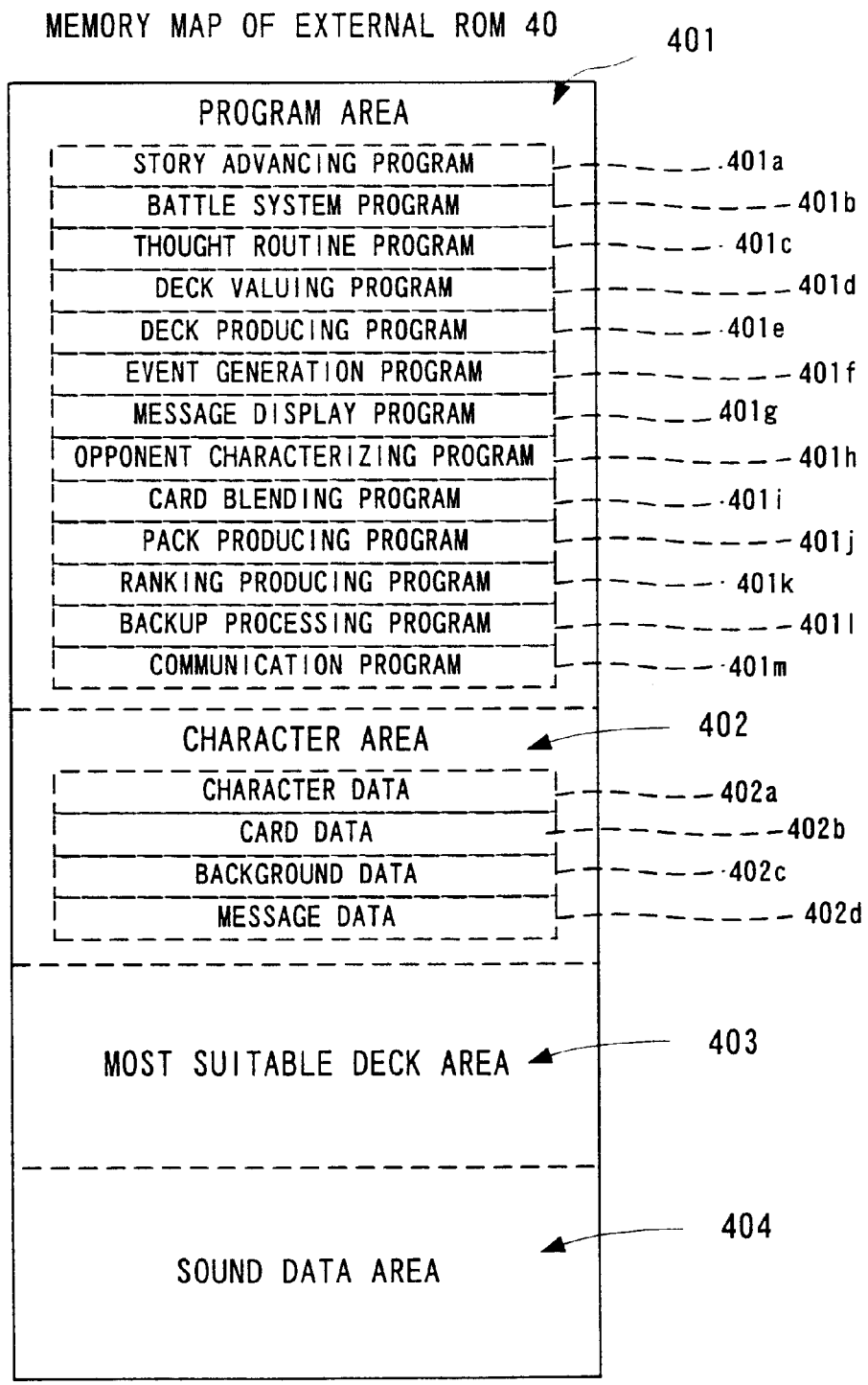
FIG. 3 is a memory map of a ROM of a cartridge.

The cartridge 16 includes an external ROM 40 and an SRAM 42. In the external ROM 40 of the cartridge 16, data is stored as shown in FIG. 3. The SRAM 42 receives power via a backup battery 44, and is used to store game backup data. Power from the backup battery 44 is also supplied to an MBC (Multi-Bank Controller) 46. The MBC 46 includes a timepiece counter 50 to receive oscillation signals of a timepiece oscillator 48, and an ROM/RAM controller 52 to control the external ROM 40 and external RAM 42.

As shown in FIG. 1, a plurality of operation keys 54a–54e are provided in a surface lower portion of the case 12. These operation keys 54a–54e constitute a key matrix 56 (FIG. 2). The CPU 24 is supplied with respective operation signals from operation keys 54a–54e of the key matrix 56. Operation key 54a is utilized to instruct a game character or cursor being displayed on the LCD 18 to move in the four directions of up, down, left or right. That is, the operation key 54a is utilized to designate a moving direction of a hereinafter-described monster card, designate a position to which a monster card is to be played, or select a monster card to be played from a card hand to the field. Operation key 54b is a select key used to select a game mode, such as of a hereinafter-described battle game (normal mode) or to display an explanatory figure of each card being displayed during battle. The operation key 54c is so-called a start key used at a beginning of a game play or in temporarily halting the game progress. The operation keys 54d and 54e are push-button switches. By operating the operation keys 54d and 54e, it is possible to play an opted monster card to the field as described below, and, as required, to make the game character being displayed on the LCD 18 act in various representations, e.g., using weapons, jumping and attacking. These operation keys 54a–54e are arranged on a main-body front of the hand-held game machine 10 as shown in FIG. 1 so that the key matrix 56 can send operation signals of operation keys 54a–54e as controller data to the CPU 24.

The CPU 24 performs data processing operations and writes display data to a display RAM 60, according to the game program or character data given from the cartridge 16 and the controller data from the operation keys 54a–54e while using, as required, an extension RAM 58. Consequently, the CPU 24 serves as display control means. The display RAM 60 is configured with two banks and has a storage area greater than the display range of the LCD 18, thereby enabling scrolling display operations in up-down and/or left-right directions on the LCD 18 screen.

As a result of data processing by the CPU 24, the sound signal to be output is adjusted in level by a volume control 62 and then output to speaker 64 and/or earphone jack 66. The output signals to be output through speaker 64 and/or earphone jack 66 include messages such as of game rules, sound effects and game music.

In the above embodiment, an explanation was given for a hand-held game machine, however, a home-use video game machine application or the like is feasible as another embodiment. Also, the external storage medium may use a memory medium in various forms, such as a CD-ROM, a DVD, a magnet-optical disk or the like, in place of the ROM cartridge 16 or in addition to the ROM cartridge 16.

As shown in FIG. 3, the external ROM 40 includes a program storage area 401, a character storage area 402, an optimal deck table storage area 403 and a sound data storage area 404.

A story advancing program 401a in the program area 401 controls the advancement of a story of a game called "Card Hero" to be explained in the embodiment, as an example of one kind of a role-playing game for the characters to battle with cards according to a story. In the embodiment, "Card Hero" uses a "deck" comprising a predetermined number of cards, e.g., three kinds of decks, 15-cards deck, 20-cards deck or 30-cards deck can be used to play a battle card game. Different game rules are set based upon the kind of deck. A battle system program 401b is a program to process a battle depending upon each deck or rule. A thought routine program 401c is a program with thought executed by CPU 24 (FIG. 1) during a hereinafter-described computer battle, personal-computer battle or the like.

A deck valuing program 401d is a program for valuing decks. A deck producing program 401e is a program to produce decks, to select a monster card or magic card having as high points as possible based upon each monster (advance guard, rear guard) or magic.

An event generation program 401f is a program to generate various events based upon time related data from the timepiece counter 46 (FIG. 2), e.g., receiving merchandise coupons on a birthday, receiving pocket money if talking to mother every day, or having a tournament on a constant day of the week.

Also, a message display program 401g is a program to display various messages, as explained below.

An opponent characterizing program 401h is a program to provide each character with a nature, e.g. an offensive character, a defensive character, etc. In the "Card Hero" game, a blending machine is prepared as one way to acquire cards wherein one card can be received upon entering three cards. A card blending program 401i is a program to run the blending machine. With the card blending program 401I, a card to be acquired by the blending machine is determined using one meaning based upon a combination of three cards (recipe) to be inserted in the machine. Consequently, by setting a card obtainable solely from the blending machine, the game player may have added pleasure in finding the card or the recipe for gaining the card. Other ways of card acquisition include purchasing cards, receiving cards, etc.

Purchasing cards for the game will be, for example, by purchasing one pack with three cards. A pack producing program 401j is a program to automatically decide the content of a card pack. A ranking producing program 401k is a program to produce ranking in view of winning score or victory percentage according to a result of a battle with each character.

Figure 7:
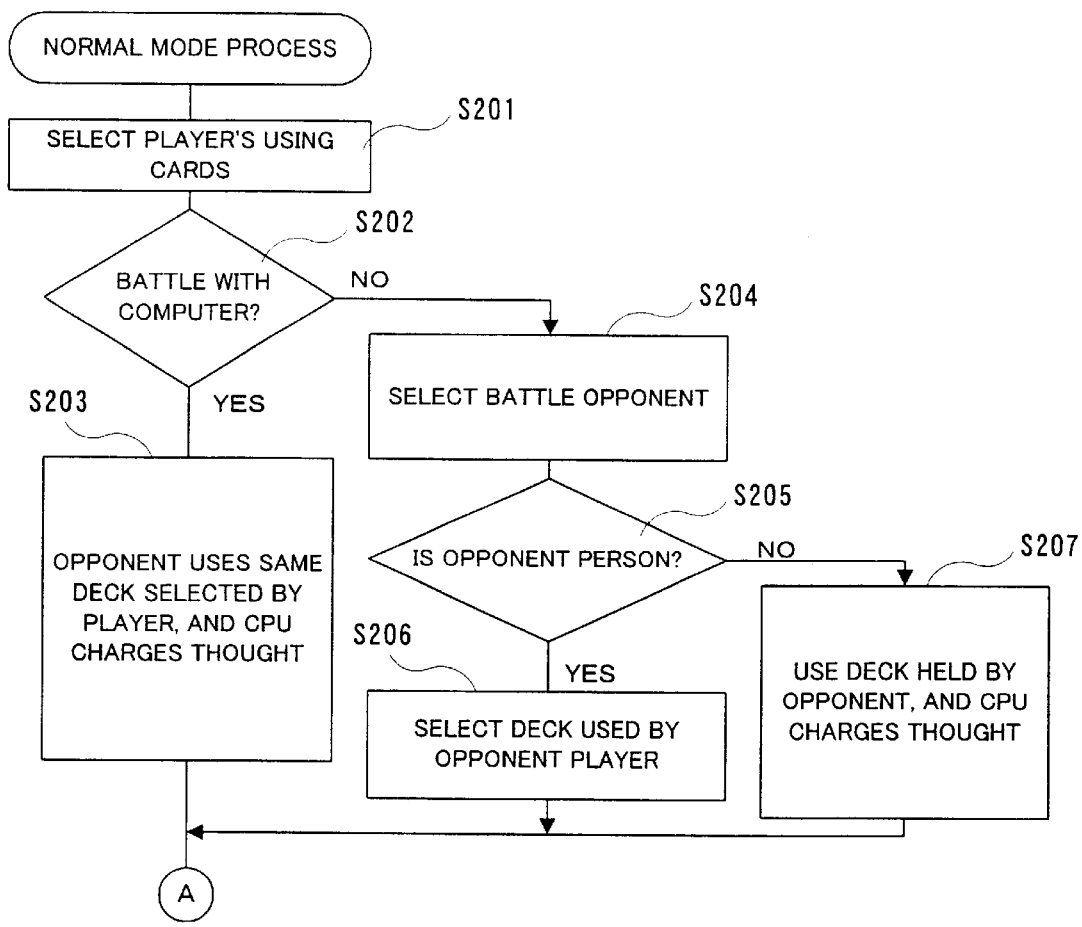
FIG. 7 is a subroutine flowchart of a normal-mode battle process.

A backup processing program 401l is a program to carry out backup on a periodic basis by the timepiece counter 50 or in accordance with the progress of the story, which automatically makes backup of a card hand or a battle state. A communication program 401m is a program to control a communication mode with other hand-held game machines as required in a battle with other game players, as in step S206 of FIG. 7.

A character area 402 of the external ROM 40 stores character/symbol data to display messages, such as of rules, advice, phrases, and operation menus, in addition to image data, e.g., of a player, a battle opponent and background.

Specifically, the character area 402 is formed with a character data area 402a. The character data area 402a stores image data to display all the characters to be displayed on the game screen. The characters include not only the players to play a card battle but also special persons for explaining game rules. In the card battle, a battle is by two masters being displayed on the game screen and monsters to battle in cooperation therewith. One master is a representation of the game player, while the other master is the representation of an opponent (e.g., a computer or another game player). That is, in the card battle, the masters are representatives of respective camps in battle, wherein the game player and the opponent in a battle are to plot tactics for finally defeating the opponent's master using monster cards, magic cards, etc.

A card data area 402b in the character area 402 stores card image data to display cards, such as monster cards, magic cards and super cards, to be used in a game.

Although not shown, each card is described with various ability values, etc. For example, the monster card is described by "monster name", "monster feature", "upgradable level", "tricks", "attack power", "attack range", "HP" (Hit Points), "rareness" and so on by letters or symbols, indicating a character illustration of that monster. Also, the magic card is described by "magic name", "magic feature", "necessary number of stones", "effects", "rareness", etc. by letters or symbols, indicating a character illustration of that magic. Also, the monster cards include two kinds of advance-guard monsters and rear-guard monsters in accordance with a magnitude of an attack range or an attack reach distance and HP. For example, the advance-guard monsters are basically positioned on a front line of a field to attack a monster in confrontation, which is a type comparatively great in HP. The rear-guard monsters are positioned substantially on a rear line of the field to attack a monster at a distance, which is a type comparatively small in HP. A card data area 402b also stores information of ability values, etc. about these cards.

Figure 6:
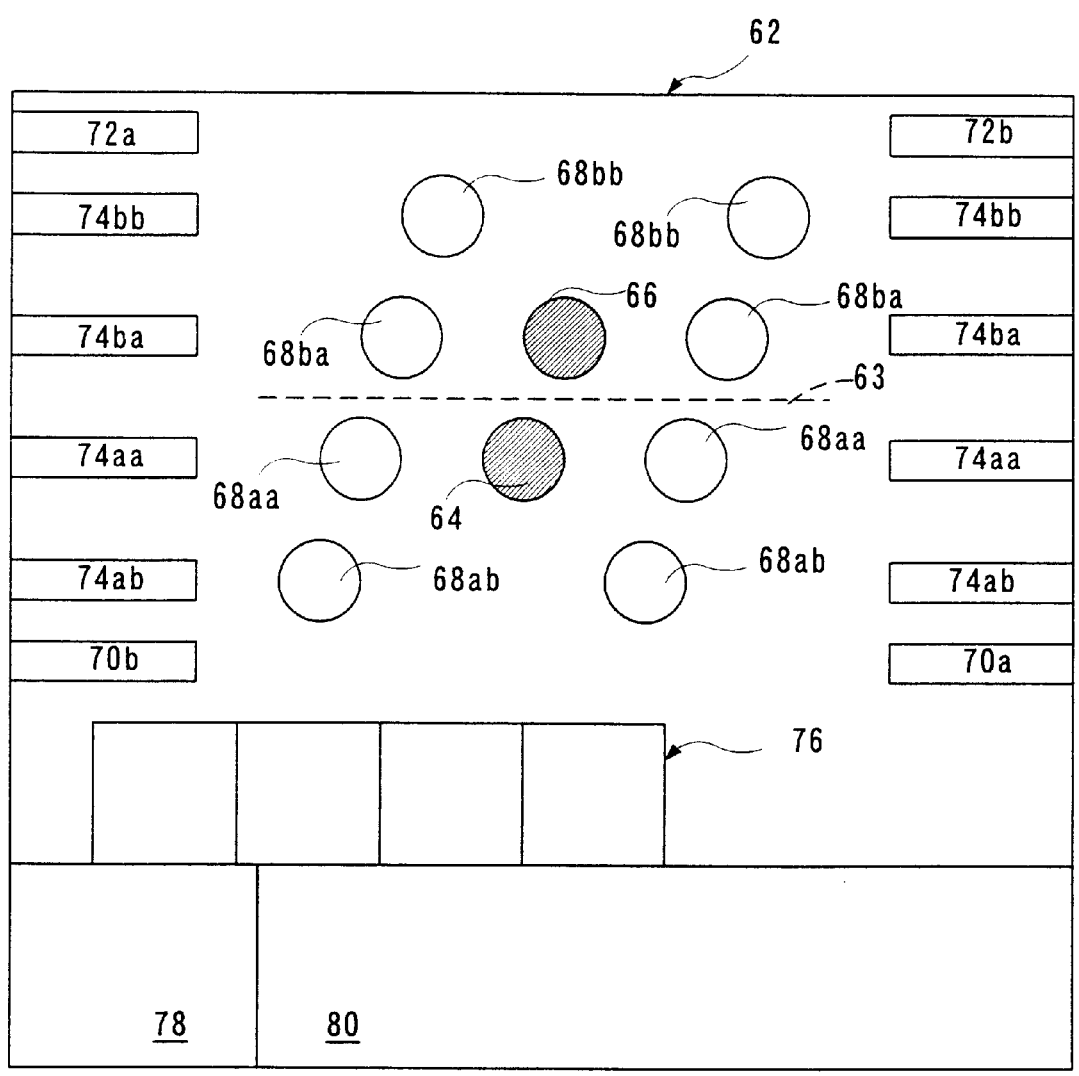
FIG. 6 is an illustrative view showing display sites on a game screen in the embodiment.

A background data area 402c stores background data to display a "field" for arranging the cards to be used in a game, locations for displaying information about the cards, and other information. Specifically, a game screen 62 displayed on the LCD 18 (FIG. 1) is shown in FIG. 6. This game screen 62 has a play field divided by a boundary line 63 into two camps, i.e., a game-player camp and an opponent camp, and display sites set as shown in FIG. 6. A first master display site 64 is a location to display one master as the representation of the game player. A second master display site 66 is a location to display the other master as the representation of the opponent.

In the vicinity of the first master display point 64, four monster-card presenting sites 68aa, 68aa, 68ab and 68ab are set as "fields" to present monster cards on the side of the game-player camp. In the vicinity of the second master display site 66, four monster-card presenting sites 68ba, 68ba, 68bb and 68bb are set as "fields" to present monster cards on the side of the opponent camp. To the monster cards presenting sites 68aa and 68ba, a monster card as an advance-guard monster mentioned above is generally to be played but, in an exceptional case, a rear-guard monster may be played to this site for tactical reasons. Likewise, to the monster card presenting sites 68ab and 68bb, a rear-guard monster as mentioned above is generally to be played but, in an exceptional case, an advance-guard monster may be played to this site for tactical reasons.

In relation to the game-player master displayed in the first master display site 64, an HP of the master (game player) and the number of "stones" in hand of that master are respectively displayed in the master-data display sites 70a and 70b of the game screen 62. In relation to the opponent master displayed in the second master display site 66, an HP of the master (opponent) and the number of "stones" in hands of that master are respectively displayed in the master-data display sites 72a and 72b of the game screen 62.

Furthermore, monster-data display sites 74aa, 74ab, 74ba and 74bb are set corresponding, respectively, to the monster presenting sites 68aa, 68ab, 68ba and 68bb. In the monster-data display sites 74aa, 74ab, 74ba and 74bb, the number of "stones" (level number) and HP of the actual monster in the corresponding site. That is, in game play, a monster card is placed face down in a corresponding monster card presenting site. When the monster card is face down, no monster data is displayed. When the monster card is turned face up and a monster depicted thereon is displayed on the game screen, monster data of that monster is displayed. Also, nothing is displayed in a monster data display site corresponding to a monster card presenting site where no monster card is placed.

On the game screen 62, a card-hand display site 76 is formed. In the hand display site 76, monster cards or magic cards are to be displayed for selection for the battle game by drawing from a card deck used by the game player. The game player can select any of the monsters card and magic cards displayed in the hand display site 76 by utilizing the operation means 54a–54e (FIG. 1), and present it to any of the monster card presenting sites 68aa and 58ab (playing the monster card to the "field" or using the magic card). The hand display site 76 can hold five cards at maximum so that six cards in maximum can be displayed by drawing one card when holding five cards.

In a lowermost area of the game screen 62, a selected-character display site 78 and a message display site 80 are formed. In the former area, a concrete design and monster data of a monster is displayed that has been selected by a cursor (not shown) from among the monsters presented in the monster-card presenting sites. In the latter area, messages of a game rule, operational advice, etc. are displayed in proper timing as was explained in prior-applied Japanese Patent Application No. 300945/1999 in addition to features and ability values of the monster selected and game progress situation.

Referring back to FIG. 3, a message data area 402d stores message data to display, in letters, rules and advice and the like as mentioned above.

An optimal deck table area 403 stores optimal deck tables as shown in table 1.

TABLE 1

| Advance Guard Monsters | Non-typed | 7 |
| Rearguard Monsters | Defense Type | 1 |
| | Attack Type | 3 |
| Magic Cards | Defense Type | 2 |
| | Attack Type | 2 |

The "Card Hero" game to be explained in the embodiment uses monster cards or magic cards to make game characters (masters) battle against each other, wherein one of the characters is manipulated by the game player. The optimal deck table shows examples of optimal combinations of the number of cards to be prepared by the game player. The optimal deck table shown in table 1 represents an example of 15-card deck. Accordingly, a hereinafter-explained deck producing program (FIG. 3) makes reference to the optimal deck table and prepares a shown number of advance-guard monster cards, rear-guard monster cards and magic cards.

A defensive type monster in table 1 refers to a monster which excels in defensive ability as compared to an offensive ability. An offensive type monster excels in offensive ability as compared to defensive ability.

Also, although not shown, the optimal deck table area 403 stores a points table having points assigned in accordance with the superiority and inferiority of each of the monster and magic cards. That is, the competent (strong) card is set with high points, while the incompetent (weak) card is with low points. Consequently, the deck producing program produces an optimal deck based on both the optimal deck table shown in table 1 and a point table (not shown).

A sound data area 404 stores sound data to output, in sound, messages stored in the message data area 402d, game sound effects, game music and so on.

Figure 4:
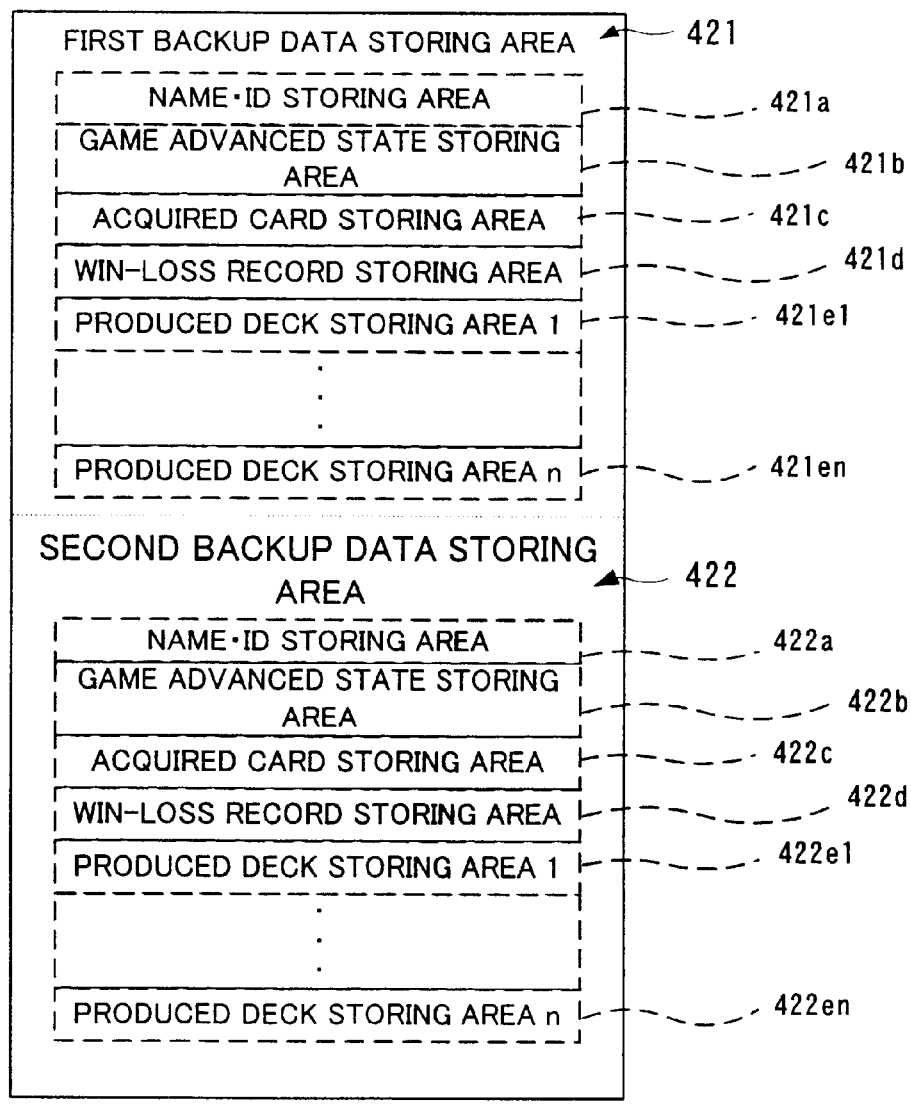
FIG. 4 is a memory map of a RAM of the cartridge.

The external RAM 42 of the cartridge 18 is formed with backup data storing areas 421 and 422 as shown in FIG. 4. Each of the backup data storing area 421 and 422 has name/identification ID storage areas 421a and 422a to store names of characters having been set by the game player together with birthday data thereof. Note that the identification ID is automatically assigned by the CPU 24. By the identification ID, setting is made for the cards obtainable and unobtainable with the cartridge. The unobtainable cards may be acquired by exchange through communication with other hand-held game machines (other cartridges).

In game advanced state storage areas 421b and 422b, game advanced state data, i.e. data such as of opponents, stages, hand cards, etc. is stored. In acquired card storage areas 421c and 422c, data of cards so far acquired is stored. In win-loss storage areas 421d and 422d, data of wins and losses on the opponent-by-opponent basis is stored. In produced deck storing areas 421e1–421en and 422e1–422en, data representative of card configurations of decks so far produced is stored.

In the exemplary embodiment, the deck prepared by the game player is stored in any of the produced deck storage areas 421e1–421en and 422e1–422en, while the deck automatically produced by CPU 24 is stored in other areas. The game player is allowed to opt and use any deck of any area.

Figure 5:
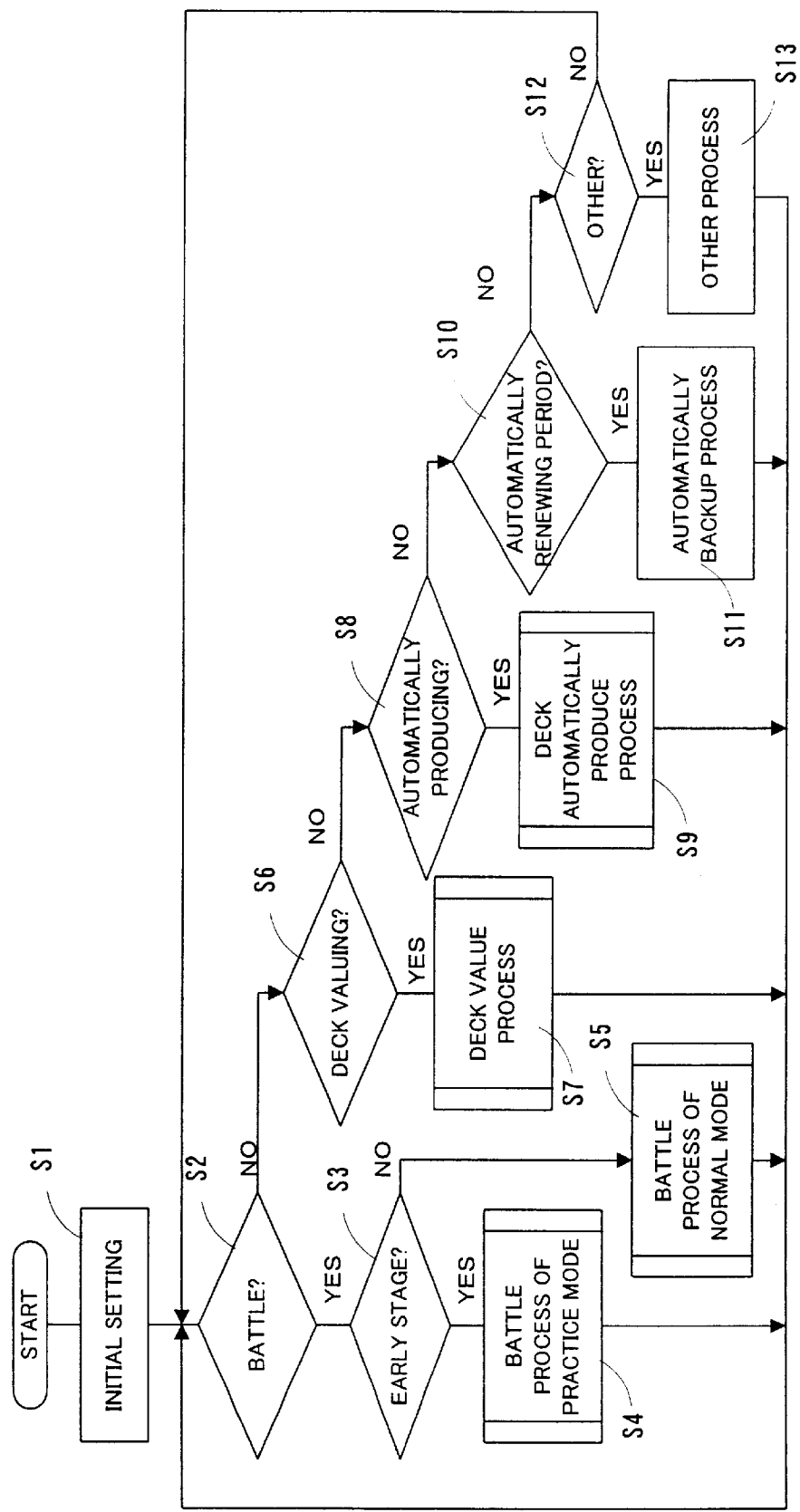
FIG. 5 is a main flowchart of game processing in one embodiment of the invention.

FIG. 5 shows a main routine of the "Card Hero" game of the embodiment. In the first step S1, the CPU 24 (FIG. 2) initially sets counter and register areas in the internal RAM 32 (FIG. 2). Subsequently, in step S2, CPU 24 determines whether the game mode selected by the game player is a battle or not. If "YES" in step S3, CPU 24 determines whether the battle is in an early stage or not. That is, in this embodiment, in order to explain game rules to the player in each battle stage after the first battle, there is a need to determine in the step S3 whether the battle is in an early stage or not, i.e. in a stage requiring explanation of a game rule, etc. The game stages include, for example, a stage where monster cards only can be used, a stage where magic cards also can be used, a stage where super cards can be used, a stage where a deck can be produced, and so on.

If "NO" is determined in step S3, i.e. the game stage has considerably advanced to a stage where explanation of a rule is no longer required, a normal-mode battle shown in FIG. 7 to FIG. 10 is executed. On the other hand, if "YES" is determined in step S3, a practice-mode routine is executed.

The normal mode shown in step S5 of FIG. 5 operates in accordance with the flowchart shown in FIG. 7 to FIG. 10. For example, in a first step S201 of the normal mode selected by moving a cursor on a menu screen, a deck to be used by the player is selected. Then, in step S202, CPU 24 determines whether the player-selected battle mode is a personal-computer battle mode or not, i.e. a mode to play a computer as an opponent with the use of the same deck as the player-selected deck. In the case of a personal-computer battle, in step S203, preparation is made for personal-computer battle. That is, in a personal-computer battle, an opponent uses the same deck as a deck selected by the player, and the CPU 24 takes charge of "thought" in the game (e.g., character control based upon assigned nature of character) according to a thought routine program 401c. The thought routine program 401c is set up such that the character behaves according to a nature assigned to that character. Also, strength levels may be set so that a level is to be selected through operation of the game player.

If "NO" in step S202, the player further selects an opponent (another character) on the menu screen. In the case where the opponent is a human (another game player), the process advances to step S206. Where the opponent is a computer, the process advances to step S207. Consequently, when the opponent is a human, in step S206 an opponent game player selects a deck. Also, where the opponent is a computer, a deck possessed by the selected character (master) is selected and the CPU 24 takes charge of thought in the game.

Figure 8:
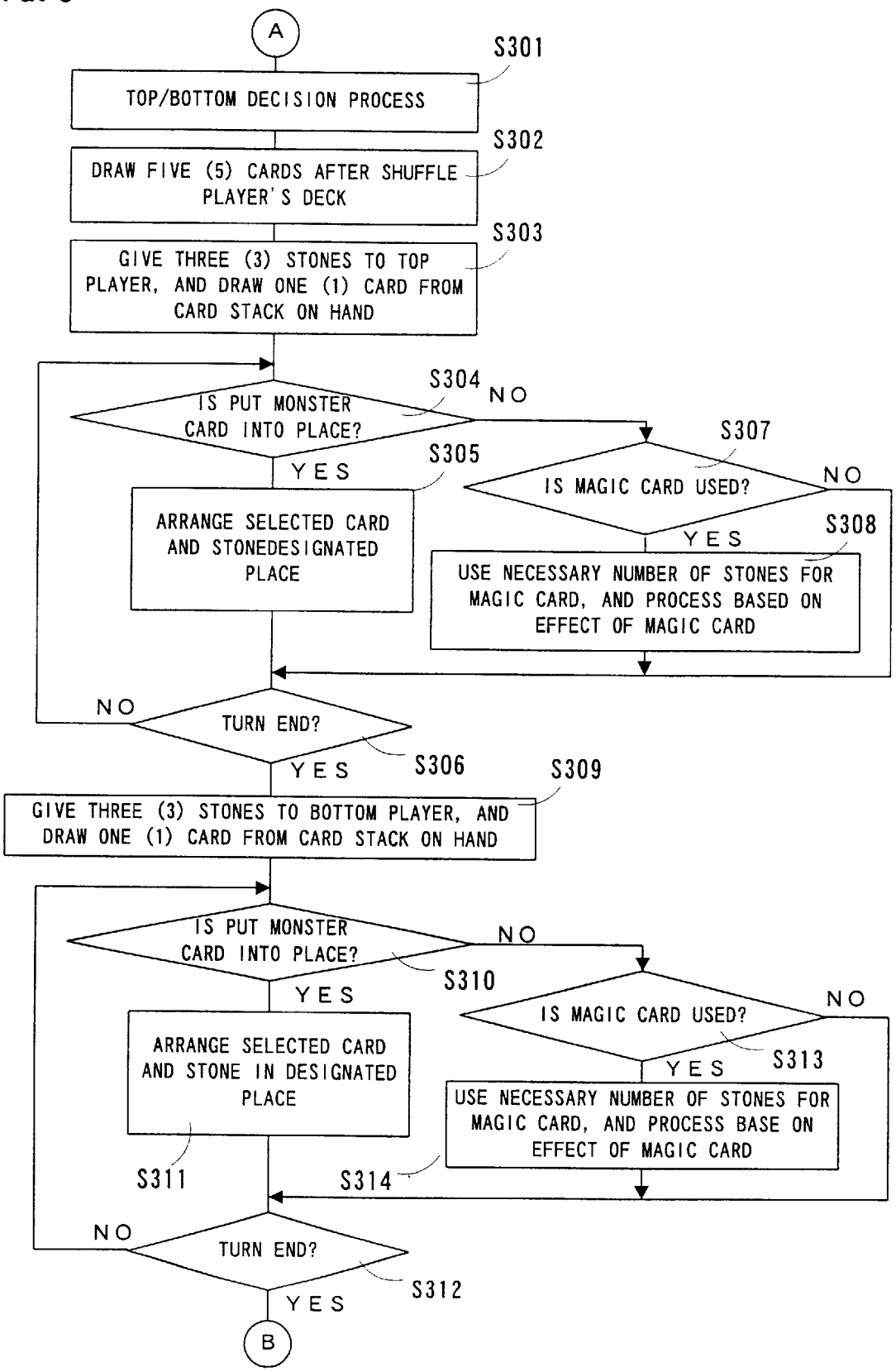
FIG. 8 is a subroutine flowchart of the normal-mode battle process following FIG. 7.

After the above preparation, the game player and the opponent are displayed as masters at predetermined master display sites 64 and 66 on the screen, and the process proceeds to step S301 (FIG. 8). In step S301, the first and second to play is determined by means, for example, of a simulated scissors-paper-rock or coin toss while displaying an image on the game screen. Then, in step S302, CPU 24 shuffles the cards of a previously-selected deck in step S201 and draws a card positioned fifth from the top while displaying a game screen. This excludes a player's arbitrary selection. Where the card drawn is not favorable, shuffling of the cards may occur only once again.

In the subsequent step S303, CPU 24 provides three "stones" to the first player (one character or master) to play and draws one card from a pile of cards in hand. The "stone" is needed when the player plays a card or raises the level (step S409), wherein one store is required upon playing a card and one is required upon raising the level by 1.

In step S304, the player first to play determines whether to play a monster card or not and manipulates a key therefor. Where playing a monster card, CPU 24 in step S305 puts a monster card face down specified by the player first to play, together with a stone, in a specified site, and in step S306 determines whether it is the end of a turn or not.

When it is determined in step S304 not to play a monster card, the player first to play determines whether or not to use a magic card against the master or monster being displayed. When using a magic card, the player in step S308 uses a required number of stones for the magic card, while the CPU 24 performs processing operations to get a predetermined effect for the relevant master or monster with the magic card. Because there is a possibility that a magic card may be unavailable in the hands, "NO" can be determined in both steps S304 and S307. After the step S308 or S307, it is determined at step S306 whether or not the turn is ended.

When turn-end is determined, CPU 24 in the next step S309 provides three "stones" to the player second to play (the other character) similar to step S303, and draws one card out of a pile of cards in hand. In step S310, the second-to-play player determines whether to play a monster card or not and performs key operation therefor. Where playing a monster card, CPU 24 in step S311 places a monster card face down specified by the second-to-play player, together with a stone, at a specified site and then determines in step S312 whether the end of a turn is reached.

When determining in step S310 not to play a monster card, the second-to-play player in step S313 determines whether to use a magic card against the master or monster card being displayed. When using a magic card, the second-to-play player in step S314 uses a required number of stones for the magic card, whereas the CPU 24 performs processing operations to obtain a predetermined effect for the relevant master or monster with the magic card. After the step S313 or S314, it is determined in step S312 whether the end of a turn is reached.

Figure 9:
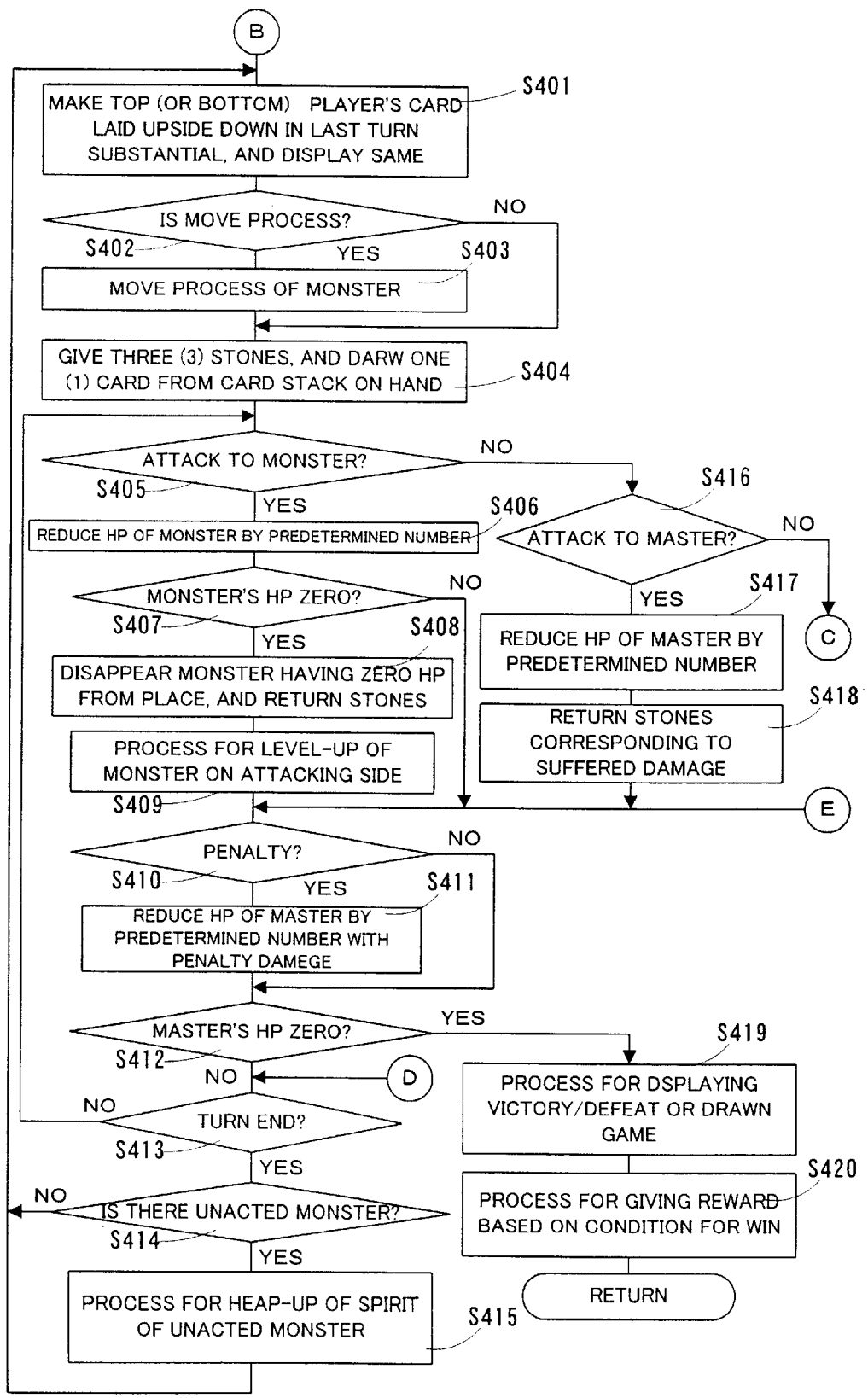
FIG. 9 is a subroutine flowchart of the normal-mode battle process following FIG. 8.

In step S401 of FIG. 9, CPU 24 turns face up the card of the player first or second to play (both characters) having been put face down in the preceding turn. In the succeeding step S402, it is determined whether or not the monster positioned behind is to be moved to a frontward vacant site. That is, it is determined whether there is a vacant site existing in the front. If "YES", a moving process is executed in step S403. Similar to the case of "NO" in step S402, in step S404 three stones are provided to the player first or second to play and one card is drawn out of the pile of cards thereof similar to step S303 or S309. That is, on each turn, three stones are provided to each player and one card is drawn out of the pile of cards.

In step S405, it is determined whether the master or monster played in the preceding turn is instructed to attack other monsters or not. If "YES", the process advances to step S406 where the CPU 24 subtracts attack points possessed by the master or monster card, e.g. "2P", from an HP (Hit Points) of the opponent monster. The CPU 24 in the succeeding step S407 determines whether the HP of the opponent monster becomes "0". If "YES", the CPU 24 in the next step 408 puts off display of that monster and returns the stone.

If the opponent's monster is defeated in this manner, a level-up process for the offensive monster is carried out in step S409. The level to be raised relies upon a level of a monster defeated. Where the level of the monster defeated is "1", the level can be increased by 1. When the level of the monster defeated is "2", the level can be increased by 2. However, as stated above, one stone is required for each level increase by 1.

In the case of "NO" in the preceding step S405, it is determined in step S416 whether attack is on a master. If "NO" is determined in step S416, the process proceeds to step S501 (FIG. 10), whereas if "YES" is determined, in step S417 the master's HP is subtracted with attack points of the card. Note that, because the master is previously given a shield of 2 points, where the attack points are for example "3", "1" is subtracted from the master's HP. In step S418, a stone corresponding to the damage suffered in the step S417 is returned to the master suffering damage. In this example, one stone is returned.

After step S409 or step S418, the CPU in step S410 determines whether there is a penalty. For example, where defeating or expelling one's own monster, a penalty count is made. Where there is a penalty, a corresponding HP is subtracted from an offensive master's HP in accordance with the penalty. For example, where defeating or expelling one's own monster, HP "1" is subtracted from the master HP. Also, where defeating one's own monster to thereby increase the level of an offensive monster, HP "1" is subtracted from the master HP each time raising the level by 1. It is determined in step S412 whether, as a result, the master HP has become "0". Where there is remaining master HP, it is determined in the next step S413 whether the end of a turn is reached. If "NO", the process returns to step S405. If "YES", the process advances to step S414 to determine whether there is an "unacted" monster. The unacted monster refers to a monster having not as yet been attacked or moved. Where there is an unacted monster, a spirit-amassing process for the unacted monster is made in step S415. Note that, in the game screen shown in FIG. 11, "spirit amassing" is shown by affixing "!" to the upper right or left of the monster. As a result of spirit amassing, the attack power and HP are both increased by "1". After processing for the unacted monster in step S415, the process returns to step S401.

If any master HP reaches "0" in step S412, the one reaching "0" loses the battle. When the HPs of the both masters become "0" at the same time, the battle is a draw. Consequently, in step S419, the CPU 24 displays win, loss or draw on the game screen. At the same time, in step S420 the winner is rewarded according to a winning condition. The winner can receive a given number of medals or cards. Also, for example, five medals will be received when defeating a master by a super card. Three medals can be received when defeating a master by an ordinary monster card. After the step S420, i.e. when the victory/defeat is clinched, the process returns to the main routine shown in FIG. 5.

In this manner, in the battle game of this embodiment, a victory is gained over the camp finally defeating an opponent's master. Accordingly, the game player can enjoy the game using a variety of tactics (strategy) including an attack on a monster and a direct attack on a master. Amusement is obtainable which is different from that of the conventional card game where victory/defeat is based solely on each one of the monster cards.

Figure 10:
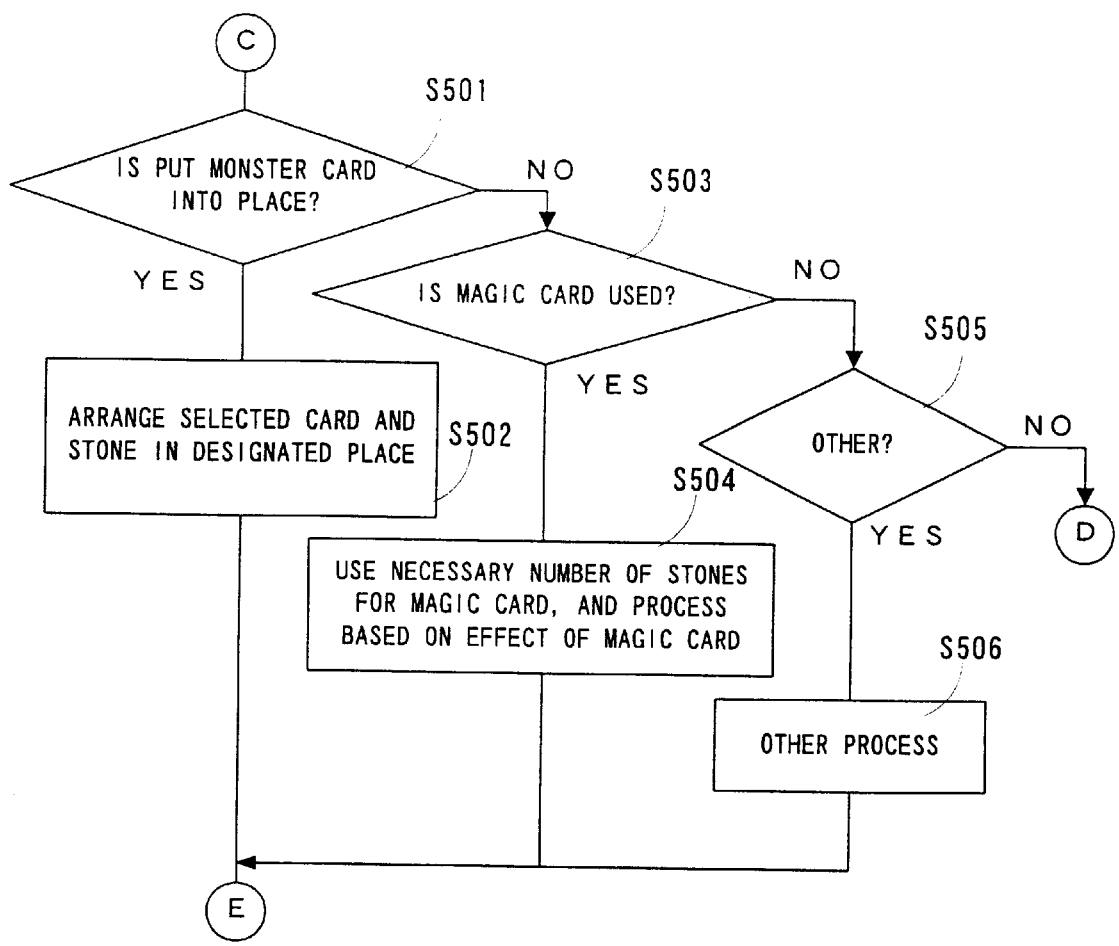
FIG. 10 is a subroutine flowchart of the normal-mode battle process following FIG. 9.

When "NO" is determined in step S416, it is confirmed at step S501 of FIG. 10 as to whether to play a monster card again. When the player determines to play a monster card, a designated monster card with one stone is put to the field similarly to the steps S305 and S311.

When "NO" is determined at step S501, it is determined in step S503 whether the player designates to play a magic card against the master or monster. In the case of a magic card, in step S504 a required number of stones for the magic card are used and an effect with the magic card is processed against the master or monster.

However, when "NO" is determined in step S503 but "YES" is determined at step S505, another process is executed at step S506, e.g., movement of the monster. Also, where "NO" is also determined in step S505, the process returns to step S413 (FIG. 9).

Figure 11:
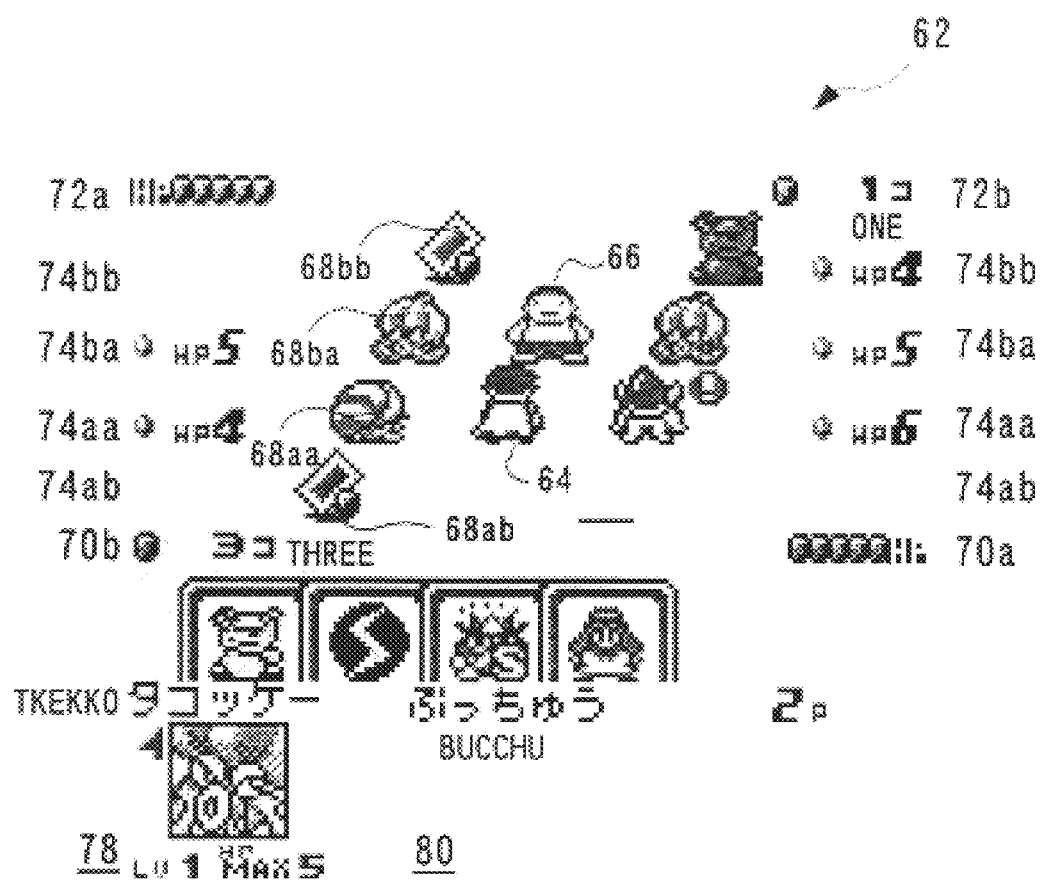
FIG. 11 is an illustration showing one example of an on-screen display of the normal-mode battle.

In such a normal mode, i.e., a battle game, figures of masters, monsters and the like are displayed in respective display sites shown in FIG. 6, as shown in FIG. 11.

If "NO" is determined in the step S2 of the main routine of FIG. 5, CPU 24 in the next step S6 determines whether the player has selected a deck valuing on the menu screen. In the case of deck valuing, the step S7 or deck valuing routine is executed.

If "NO" is determined at step S8 of the main routine of FIG. 5, it is determined in the next step S10 whether an automatic backup-updating session is to occur. If "YES" is determined in the step S10, the data in the backup areas 421 and 422 shown in FIG. 4 is rewritten according to the backup process program 4011 (FIG. 3).

If "NO" is determined in step S10 of the main routine of FIG. 5, CPU 24 in the next step S12 determines whether another process is selected. When another process has been selected, another process is executed in step S13. Here, another process is meant to receive pocket money from the mother, purchase a card or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A card game apparatus for playing a battle game between a game player and an opponent which respectively have associated characters representing masters and monsters through the use of cards, comprising:

first master character data storage storing an image of a first master representing a game player to be displayed in a game player camp display area and storing an ability value data associated with the first master;

second master character data storage storing an image of a second master representing an opponent to be displayed in an opponent camp display area and storing an ability value data associated with the second master;

card data storage storing images of a plurality of monster character cards and storing associated ability value data;

a display for displaying the first master and at least one monster in the game player camp display area and the second master and at least one monster in the opponent camp display area according to the data stored in said first master data storage, said second master data storage and said card data storage; and a processor for arithmetically determining a result of a battle based upon the ability value data of the first master or the monster character in the game player camp and the ability value data of the second master or the monster in the opponent camp.

2. A card game apparatus according to claim 1, wherein said processor is operable to determine whether the game is won or lost as a result of the arithmetically determining operation.

3. A card game apparatus according to claim 1, further comprising background data storage for storing background data including a first display site to display the first master, a second display site to display the second master, a third display site to display a monster character card in the vicinity of the first master, and a fourth display site to display a monster character card in the vicinity of the second master, wherein said display displays the first master and the second master respectively in the first display site and the second display site, and displays the at least one monster character in the third display site and the fourth display site.

4. A card game apparatus according to claim 3, wherein said background data storage stores background data including a fifth site to display a plurality of monster character cards selectable by the game player, further comprising an operating member to be operated by the game player, wherein the game player is allowed to select any of the plurality of monster character cards in the fifth site and display the monster in the third display site by operating said operating member, said operating member controlling a result of the battle based on an ability value of the first master or the monster displayed in the third display site and an ability value of the second master or the monster displayed in the fourth display site.

5. A card game apparatus according to claim 4, wherein the third display site and the fourth display site respectively include monster character display sites in plurality.

6. A card game apparatus according to claim 5, wherein the plurality of monsters include an advance-guard monster character capable of attacking a master or a monster at a near position and a rear-guard monster capable of attacking a master or a monster at a distant position, the advance-guard monster and the rear-guard monster being displayed in respective monster character display sites in the third display site and the fourth display site.

7. A card game apparatus according to claim 1, further comprising magic card data storage for storing magic card data to apply said magic card data to the master or the monster and ability values thereof, wherein said magic cards are used against the master or monster, wherein said processor performs processing operations to control the effect of a magic card used against the master or the monster.

8. A card game apparatus according claim 1, wherein at least one of said first master, second master and card data storage is included in a storage medium to be removably attached to said card game apparatus.

\* \* \* \* \*